United States Patent [19]

Jaaskelainen, Jr.

[11] Patent Number: 5,732,228
[45] Date of Patent: Mar. 24, 1998

[54] METHOD AND SYSTEM FOR PER WIDGET GRAPHICAL POINTER CONTROL WITHIN A DATA PROCESSING SYSTEM GRAPHICAL USER INTERFACE

[75] Inventor: William Jaaskelainen, Jr., Austin, Tex.

[73] Assignee: International Business Machines Corporation, Armonk, N.Y.

[21] Appl. No.: 557,877

[22] Filed: Nov. 14, 1995

[51] Int. Cl.$^6$ .................................................. G06F 3/14
[52] U.S. Cl. ................................................ 395/333; 345/145
[58] Field of Search ......................................... 395/155, 156, 395/159, 161, 157, 333, 339, 341, 973; 345/145, 157, 159, 123

[56] References Cited

U.S. PATENT DOCUMENTS

| | | | |
|---|---|---|---|
| 4,987,411 | 1/1991 | Ishigami | 345/159 |
| 5,191,641 | 3/1993 | Yamamoto et al. | 395/118 |
| 5,374,942 | 12/1994 | Gilligan et al. | 345/157 |
| 5,432,531 | 7/1995 | Calder et al. | 345/145 X |
| 5,473,343 | 12/1995 | Kimmich et al. | 345/145 |
| 5,495,566 | 2/1996 | Kwatinetz | 395/341 |
| 5,508,717 | 4/1996 | Miller | 345/145 |
| 5,559,943 | 9/1996 | Cyr et al. | 345/145 X |
| 5,586,243 | 12/1996 | Barber et al. | 395/145 X |

OTHER PUBLICATIONS

Cowart, Mastering Windows 3.1 Special Edition, Sybex, Inc., pp. 150, 165–167, 688–689, 1993.

*Primary Examiner*—Raymond J. Bayerl
*Assistant Examiner*—Crescelle N. dela Torre
*Attorney, Agent, or Firm*—Mark S. Walker; Brian F. Russell; Andrew J. Dillon

[57] ABSTRACT

A method and system are disclosed for controlling the movement of a graphical pointer displayed within a display device of a data processing system having a graphical pointing device. According to the present invention, a widget, a predefined region within a graphical display, and a graphical pointer are displayed within the display device of the data processing system. When the graphical pointer is displayed at positions within the widget, a first relationship correlates manipulation of the graphical pointing device and movement of the graphical pointer within the display device. Conversely, when the graphical pointer is displayed at positions without the widget, a second relationship correlates manipulation of the graphical pointing device and movement of the graphical pointer within the display device. In response to manipulation of the graphical pointing device, movement of the graphical pointer is determined in accordance with the first relationship when the graphical pointer is displayed at positions within the widget and in accordance with the second relationship when the graphical pointer is displayed at positions without the widget, wherein control of the graphical pointer is enhanced.

17 Claims, 6 Drawing Sheets

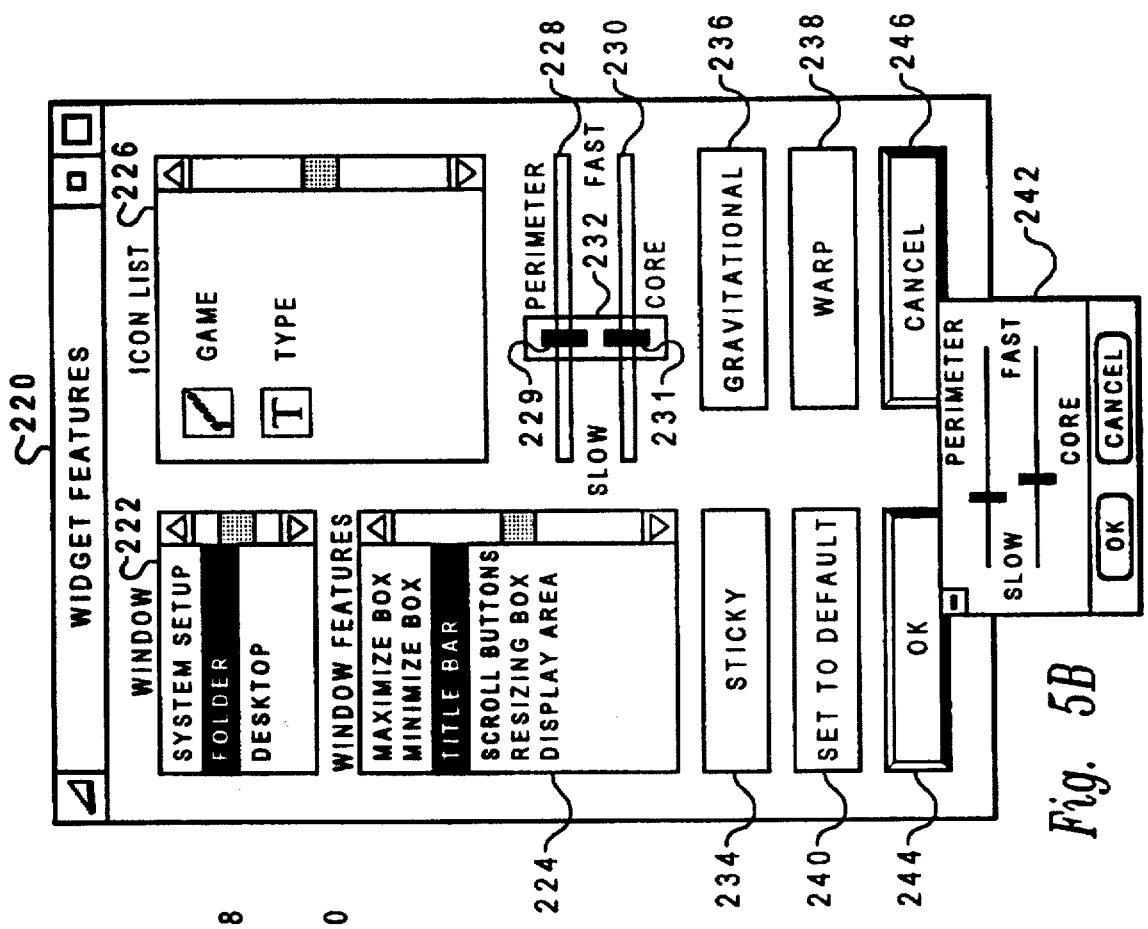
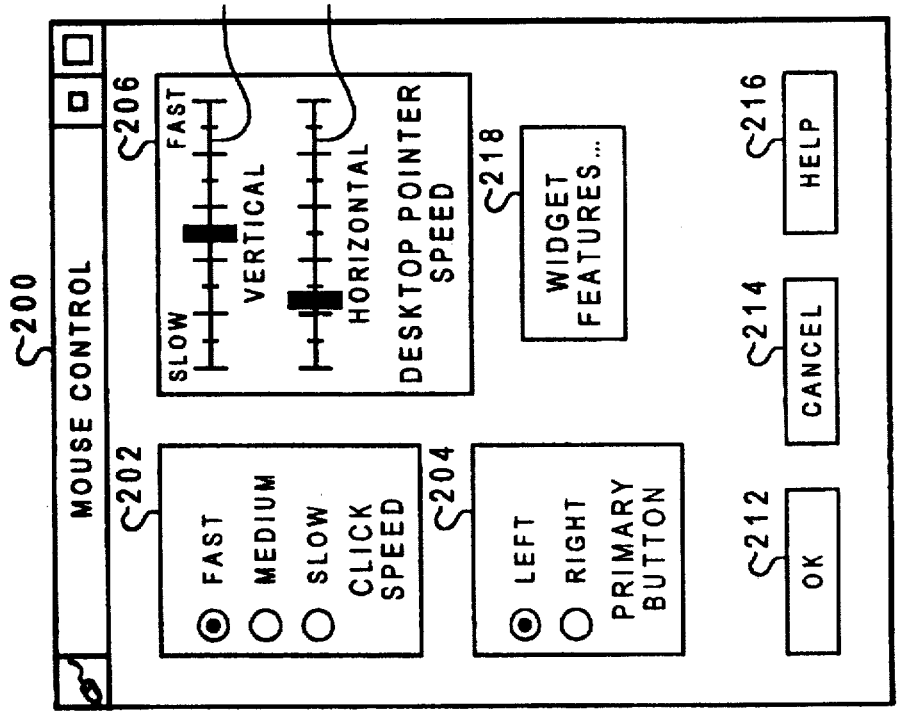
Fig. 5B
Fig. 5A

METHOD AND SYSTEM FOR PER WIDGET GRAPHICAL POINTER CONTROL WITHIN A DATA PROCESSING SYSTEM GRAPHICAL USER INTERFACE

BACKGROUND OF THE INVENTION

1. Technical Field

The present invention relates in general to a method and system for data processing and in particular to an improved method and system of user interface to a data processing system. Still more particularly, the present invention relates to an improved method and system for positioning a graphical pointer within a data processing system by providing per widget graphical pointer control.

2. Description of the Related Art

Within data processing systems, user interface is accomplished in a variety of ways. An increasingly common type of user interface is a graphical user interface (GUI), which provides a user with a graphical and intuitive display of information. Typically, the user interacts with a GUI display with a graphical pointer, which a user controls utilizing a graphical pointing device, such as a mouse, track ball, or joystick. Depending upon the actions allowed by the application of operating system software, the user can select a widget (i.e., a user-discernable feature of the graphic display) by positioning the graphical pointer over the widget and depressing a button associated with the graphical pointing device. Furthermore, depending upon the type of widget, the user can relocate the widget within the graphical display utilizing the well-known drag-and-drop technique. Conventionally, the motion of the graphical pointer within the GUI display has a fixed relationship to the manipulation of the graphical pointing device over all portions of the graphical display. For example, if the user moves the graphical pointing device two units to the right, the graphical pointer responds by moving two scaled units to the right within the GUI graphical display.

To accommodate the preferences of a variety of users, many operating systems provide facilities which enable either an application or the user or both to set the tracking speed of the graphical pointer in relationship to the manipulation of the graphical pointing device. For example, some users prefer to set the tracking speed of the graphical pointer to a high sensitivity setting in order to limit the amount of manipulation required to traverse the graphical display or to conveniently select large widgets within the graphical display. However, a high sensitivity setting can make selection of small widgets difficult due to the precision that such a selection requires. Although setting the graphical pointer control to a lower sensitivity facilitates selecting small widgets within the graphical display, a low sensitivity setting can be irritating to a user because of the effort required to traverse the graphical display.

Consequently, it would be desirable to provide an improved method and system for controlling the movement of a graphical pointer within a GUI. In particular, it would be desirable to provide a method and system for controlling the movement of a graphical pointer which enable application software or a user to determine the sensitivity of the graphical pointer to manipulation of a graphical pointing device on a per widget basis.

SUMMARY OF THE INVENTION

It is therefore one object of the present invention to provide an improved method and system for data processing.

It is another object of the present invention to provide an improved method and system of user interface within a data processing system.

It is yet another object of the present invention to provide an improved method and system for controlling the movement of a graphical pointer within the graphical user interface (GUI) of a data processing system.

The foregoing objects are achieved as is now described. A method and system are disclosed for controlling the movement of a graphical pointer displayed within a display device of a data processing system having a graphical pointing device. According to the present invention, a widget, a predefined region within a graphical display, and a graphical pointer are displayed within the display device of the data processing system. When the graphical pointer is displayed at positions within the widget, a first relationship correlates manipulation of the graphical pointing device and movement of the graphical pointer within the display device. Conversely, when the graphical pointer is displayed at positions without the widget, a second relationship correlates manipulation of the graphical pointing device and movement of the graphical pointer within the display device. In response to manipulation of the graphical pointing device, movement of the graphical pointer is determined in accordance with the first relationship when the graphical pointer is displayed at positions within the widget and in accordance with the second relationship when the graphical pointer is displayed at positions without the widget, wherein control of the graphical pointer is enhanced.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIGS. 5A and 5B illustrate dialog boxes utilized by a user to control the tracking speed of a graphical pointer displayed within the display device of the data processing system depicted in FIG. 1.

DETAILED DESCRIPTION OF PREFERRED EMBODIMENT

Figure 1:
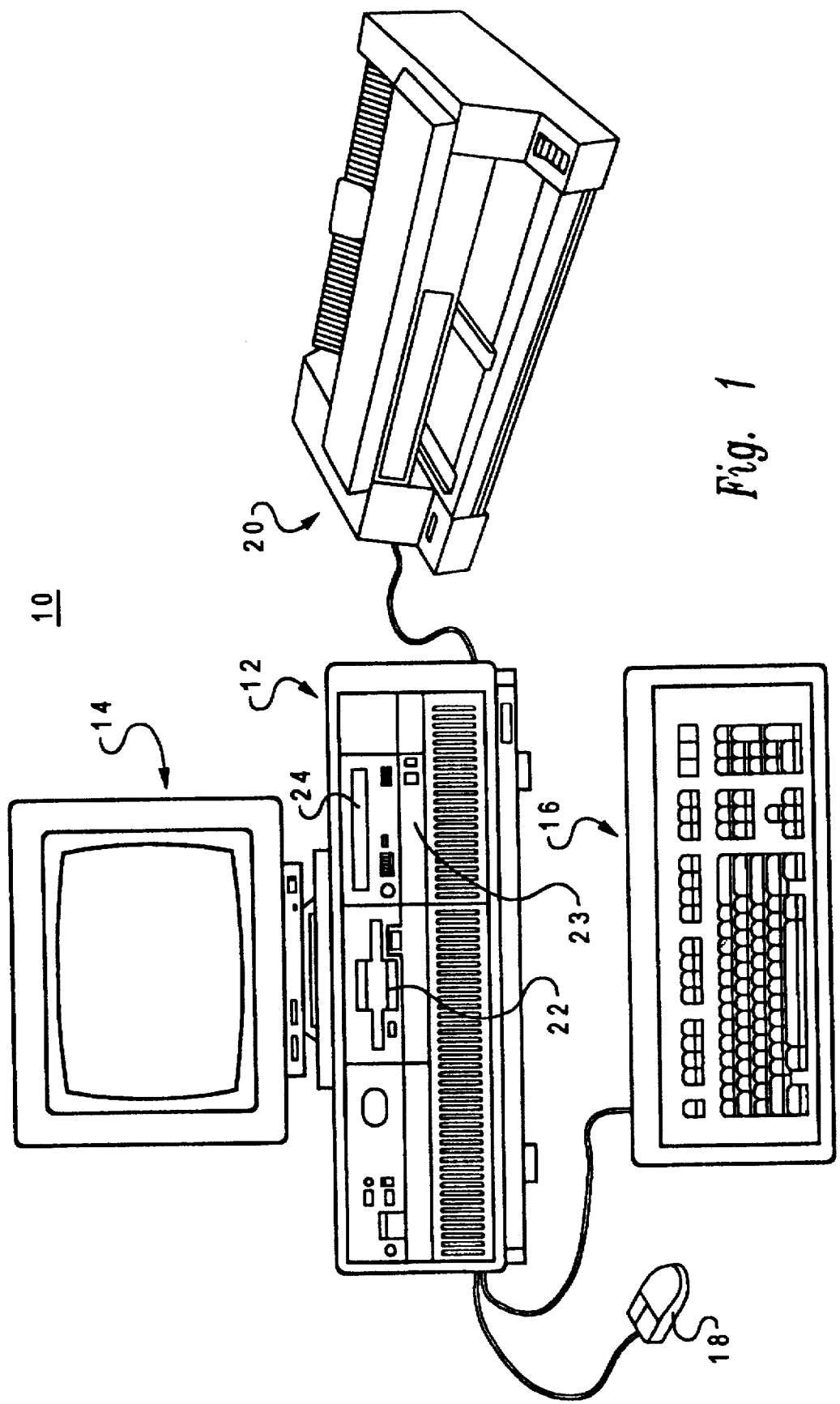
FIG. 1 is a pictorial representation of a data processing system which may be utilized to implement the method and system of the present invention.

With reference now to the figures and in particular with reference to FIG. 1, there is illustrated a preferred embodiment of a data processing system which may be utilized to implement the method of the present invention. As illustrated, data processing system 10 includes system unit 12, display device 14, keyboard 16, mouse 18, and printer 20. As is well-known in the art, system unit 12 receives data for processing from input devices such as keyboard 16, mouse 18, or local area networking interfaces (not illustrated). Mouse 18 is preferably utilized in conjunction with a graphical user interface (GUI) in which hardware and software system objects, including data processing system components and application programs, are controlled through the selection and manipulation of associated graphical objects displayed within display device 14. Although data processing system 10 is illustrated with mouse 18, those skilled in the art will recognize that other graphical pointing devices, including a graphics tablet, stylus, light pen, joystick, puck, trackball, trackpad, and the IBM TrackPoint™ can also be utilized. Data processing system 10 presents output data to a user via display device 14 and printer 20. To support storage and retrieval of data, system unit 12 further includes diskette drive 22, hard disk drive 23, and CD-ROM drive 24, which are connected to system unit 12 in a well-known manner. Of course, those skilled in the art are aware that other conventional components can also be connected to system unit 12.

Figure 2:
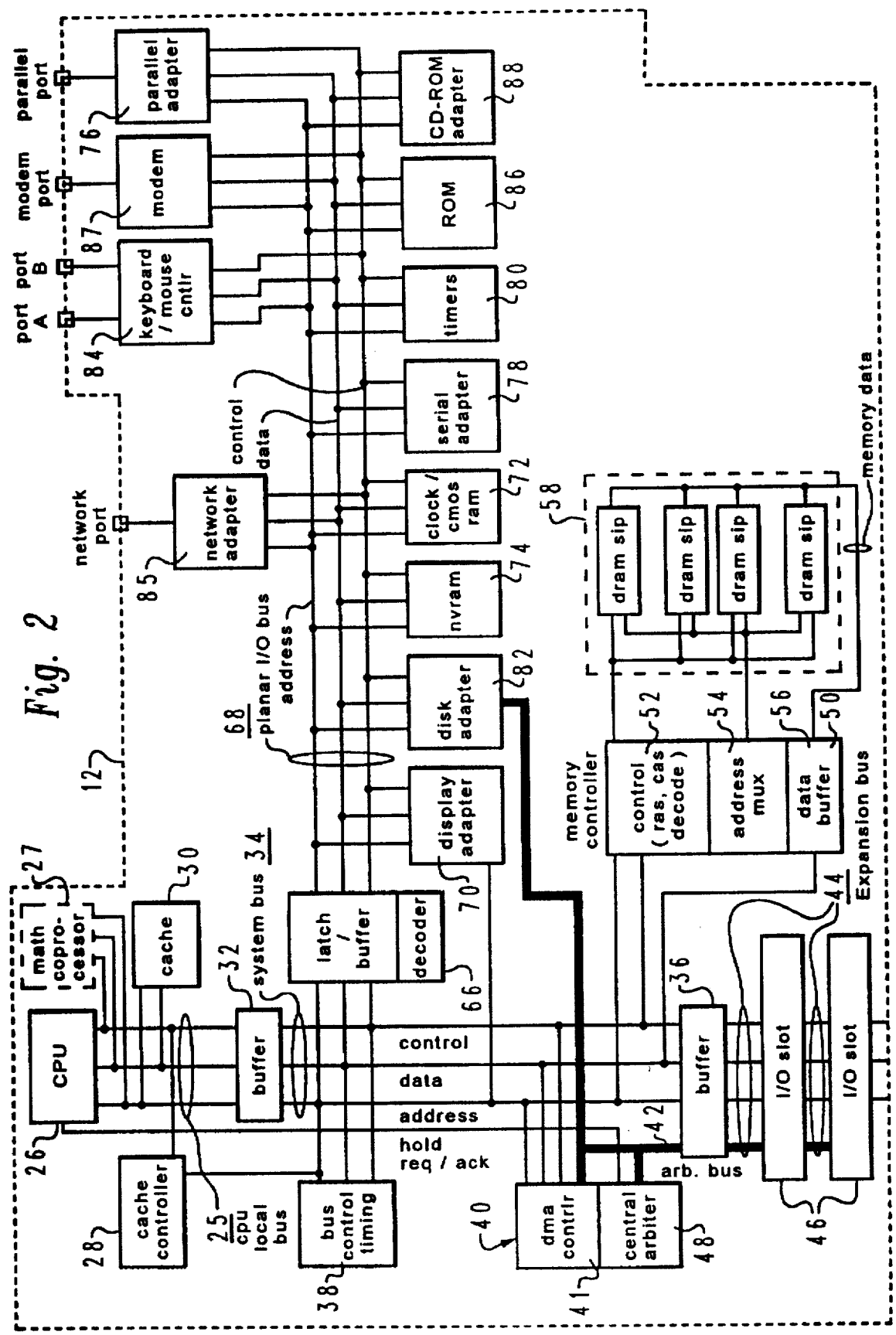
FIG. 2 depicts a block diagram of the system unit of the data processing system illustrated in FIG. 1.

Referring now to FIG. 2, there is depicted a block diagram of the principal components of system unit 12 of data processing system 10. As illustrated, system unit 12 includes a central processing unit (CPU) 26 which executes software instructions. While any appropriate microprocessor can be utilized for CPU 26, CPU 26 is preferably one of the PowerPC™ line of microprocessors available from IBM Microelectronics. Alternatively, CPU 26 can be implemented as one of the 80×86 microprocessors, which are available from a number of vendors. In addition to CPU 26, an optional math coprocessor 27, cache controller 28, and cache memory 30 are coupled to high-speed CPU local bus 25. Math coprocessor 27 is an optional processor, distinct from CPU 26, that performs mathematic computations with greater efficiency than CPU 26. Math coprocessor 27 is optional since the performance advantage provided by a math coprocessor may be achieved by enhancements to CPU 26, such as the implementation of multiple floating-point execution units. Cache memory 30 comprises a small high-speed memory which stores frequently accessed data and instructions. The operation of cache 30 is controlled by cache controller 28, which maintains a directory of the contents of cache 30 and enforces a selected cache coherency protocol.

CPU local bus 25 is coupled to buffer 32 to provide communication between CPU local bus 25 and system bus 34, which extends between buffer 32 and a further buffer 36. System bus 34 is connected to bus control and timing unit 38 and direct memory access (DMA) unit 40, comprising central arbiter 48 and DMA controller 41. DMA controller 41 supports memory accesses that do not involve CPU 26. Direct memory accesses are typically employed to transfer data directly between RAM 58 and an "intelligent" peripheral device, such as disk adapter 82. DMA requests from multiple peripheral devices are arbitrated by central arbiter 48. As described below, central arbiter 48 also regulates access to devices coupled to expansion bus 44 by control signals transmitted via arbitration control bus 42.

CPU 26 accesses data and instructions from and stores data to volatile random access memory (RAM) 58 through memory controller 50, which comprises memory control unit 50, address multiplexer 54, and data buffer 56. Memory control unit 52 generates read enable and write enable signals to facilitate storage and retrieval of data and includes address translation facilities that map virtual addresses utilized by CPU 26 into physical addresses within RAM 58. As will be appreciated by those skilled in the art, RAM 58 comprises a number of individual volatile memory modules which store segments of operating system and application software while power is supplied to data processing system 10. The software segments are partitioned into one or more virtual memory pages which each contain a uniform number of virtual memory addresses. When the execution of software requires more pages of virtual memory that can be stored within RAM 58, pages that are not currently needed are swapped with the required pages, which are stored within nonvolatile storage devices 22–24.

Memory controller 50 further includes address multiplexer 54, which selects particular addresses within RAM 58, and data buffer 56, which buffers data read from and stored to RAM 58. Memory controller 50 also provides memory protection that isolates system processes and user processes within the virtual address space allocated to each process. Thus, a program running in user mode can access only memory allocated to its virtual address space; the user mode program cannot access memory within another process's virtual address space unless memory sharing between the processes is supported and the program has the appropriate privileges for the access.

Still referring to FIG. 2, buffer 36 provides an interface between system bus 34 and expansion bus 44. Connected to expansion bus 44 are a number of I/O slots 46 for receiving adapter cards which may be further connected to an I/O device or memory. Arbitration control bus 42 couples DMA controller 41 and central arbiter 48 to I/O slots 46 and disk adapter 82. By implementing a bus arbitration protocol, central arbiter 48 regulates access to expansion bus 44 by extension cards, controllers, and CPU 26. In addition, central arbiter 48 arbitrates for ownership of expansion bus 44 among the bus masters coupled to expansion bus 44. Bus master support allows multiprocessor configurations of expansion bus 44 to be created by the addition of bus master adapters containing a processor and its support chips.

System bus 34 is coupled to planar I/O bus 68 through buffer 66. Attached to planar I/O bus 68 are a variety of I/O adapters and other peripheral components, including display adapter 70, disk adapter 82, nonvolatile RAM 74, clock 72, serial adapter 78, timers 80, read only memory (ROM) 86, CD-ROM adapter 88, keyboard/mouse controller 84, network adapter 85, modem 87, and parallel adapter 76. Display adapter 70 translates graphics data from CPU 26 into R, G, and B video signals utilized to drive display device 14. Depending upon the operating system and application software running, the visual output may include text, graphics, animation, and multimedia video. Disk adapter 82 controls the storage of data to and the retrieval of data from hard disk drive 24 and diskette drive 22. Disk adapter 82 handles tasks such as positioning the read/write heads within drives 22 and 23 and mediating between drives 22 and 23 and CPU 26. Nonvolatile RAM 74 stores system configuration data that describes the present configuration of data processing system 10. For example, nonvolatile RAM 74 contains information that describes the capacity of hard disk drive 24 or a diskette placed within diskette drive 22, the type of display device 14, the amount of free RAM 58, and the present system configuration. These data remain stored in nonvolatile RAM 74 when power is removed from data processing system 10.

Clock 72 is utilized by application programs executed by CPU 26 for time of day calculations. Serial adapter 78 provides a synchronous or asynchronous serial interface which enables data processing system 10 to communicate with a remote data processing system or peripheral device. Serial communication is governed by a serial communication protocol such as RS-232, RS-422, or the like. Timers 80 comprise multiple interval timers which may be utilized by application or operating system software to time one or more selected events within data processing system 10.

ROM 86 typically stores a basic input/output system (BIOS) which provides user-transparent I/O when CPU 26 is operating under the DOS operating system. BIOS also includes power on self-test (POST) diagnostic routines which perform system set up at power on. For example, POST interrogates hardware, allocates a BIOS data area (BDA), constructs an interrupt vector table to point to interrupt handling routines within ROM 86, and initializes timers 80, clock 72 and other devices within system unit 12. CD-ROM adapter 88 interfaces CD-ROM drive 24 with planar I/O bus 34 to support retrieval of data from an optical disk loaded within CD-ROM drive 24. Keyboard/mouse controller 84 interfaces system unit 12 with keyboard 16 and a graphical pointing device such as mouse 18. As will be described in greater detail below, keyboard/mouse controller 84 receives a serial signal from mouse 18 that indicates each incremental displacement of mouse 18.

Finally, system unit 12 includes network adapter 85, modem 87, and parallel adapter 76, which facilitate communication between data processing system 10 and peripheral devices or other data processing systems. Network adapter 85 is utilized to connect data processing system 10 to an unillustrated local area network (LAN). A LAN provides a user of data processing system 10 with a means of electronically communicating information, including software, with a remote computer or a network logical storage device. Additionally, LAN supports distributed processing, which enables data processing system 10 to share a task with other data processing systems linked to the LAN. Modem 87 supports communication between data processing system 10 and another data processing system over a standard telephone line. For example, modem 87 may be utilized to connect data processing system 10 to an on-line information service, such as the information service provided by Prodigy Services Corporation under the service mark "PRODIGY." Such on-line service providers frequently offer software that can be downloaded into data processing system 10 via modem 87. Furthermore, through modem 87, data processing system 10 can access other sources of software, such as a server, an electronic bulletin board, and the Internet or World Wide Web. Parallel port 76 transmits printer control signals and output data to printer 20 through a parallel port.

As is typical of many data processing systems, following power-on, the various hardware components of data processing system 10 will each execute its own internal reset procedures to regain a stable, known state. At the completion of these reset procedures, CPU 26 will execute POST code within ROM 86 to initialize system hardware, setup the BIOS data area, and construct and interrupt vector table, as well as other tasks. Following POST, a "boot strap" or primary operating system loader is run to load segments of an operating system (OS) 100 (see FIG. 3) into RAM 58 and launch execution of OS 100, which in a preferred embodiment of the present invention comprises OS/2 Warp, available from IBM Corporation.

Figure 3:
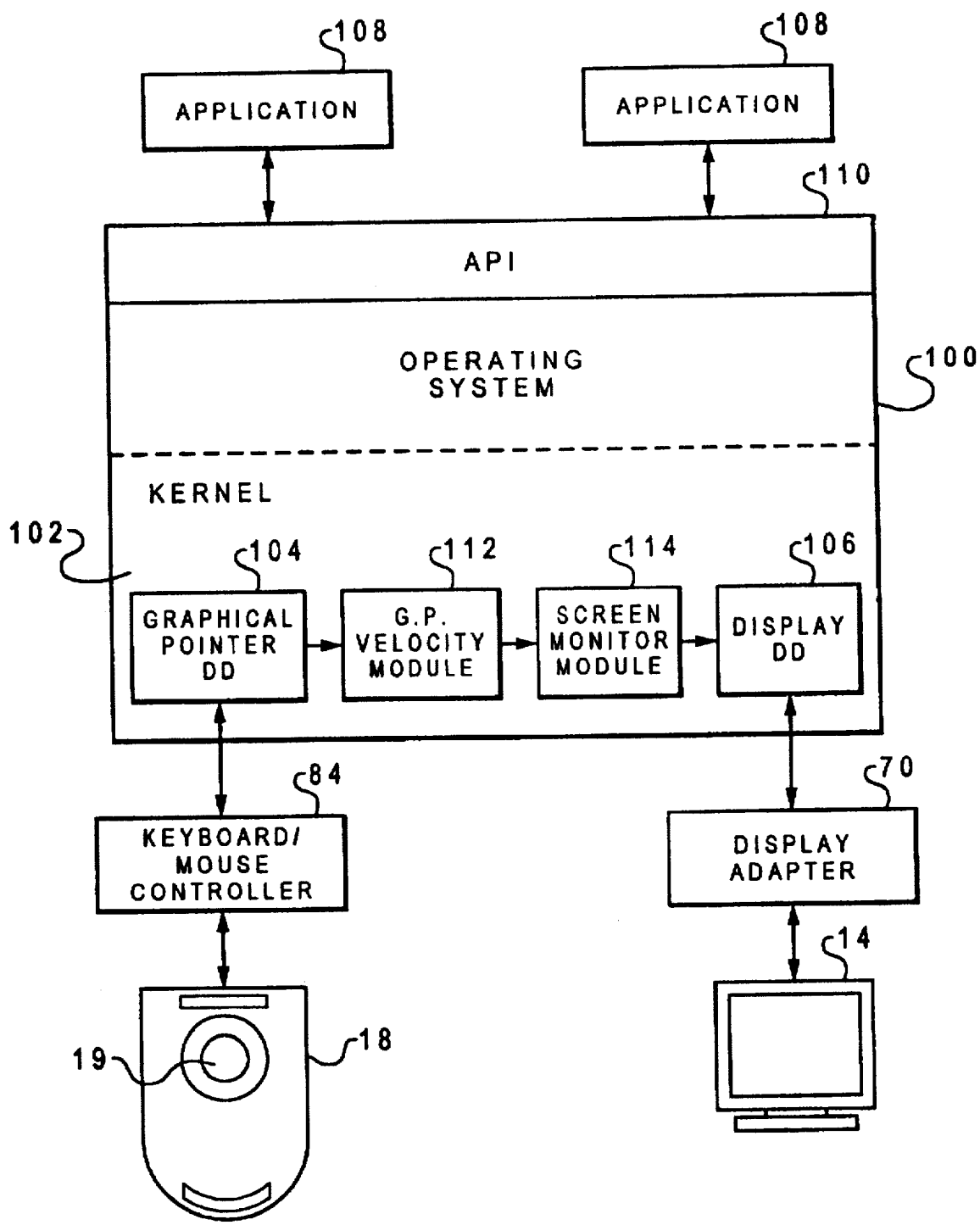
FIG. 3 illustrates a conceptual diagram of the interaction between a graphical pointing device, the software configuration utilized by the present invention, and a display device.

With reference now to FIG. 3, there is illustrated a pictorial representation of the software configuration of data processing system 10 following power-on. As depicted, the software configuration of data processing system 10 comprises OS 100, which includes kernel 102, and one or more applications 108, which communicate with OS 100 through Application Programming Interface (API) 110. Kernel 102 comprises the lowest level of OS 100 that controls the operation of the hardware components of data processing system 10 through device drivers, such as graphical pointer device driver 104 and display device driver 106.

As illustrated, graphical pointer device driver 104 and display device driver 106 communicate with keyboard/mouse controller 84 and display adapter 70, respectively, to support the interconnection of mouse 18 (illustrated in a bottom view) and display device 14 with data processing system 10. In response to movement of trackball 19 of mouse 18, mouse 18 transmits an analog graphical pointer signal to keyboard/mouse controller 84 that describes the direction and rotation of trackball 19. Keyboard/mouse controller 84 digitizes the analog graphical pointer signal and transmits the digitized graphical pointer signal to graphical pointer device driver 104, which thereafter interprets the digitized graphical pointer signal and routes the interpreted graphical pointer signal to graphical pointer velocity module 112 within kernel 102. Graphical pointer velocity module 112 modifies the interpreted graphical pointer signal to retard or accelerate the rate of movement of the graphical pointer manipulated utilizing mouse 18. Graphical pointer velocity module then passes the modified and interpreted graphical pointer signal to screen monitor module 114, which performs GUI actions based on the position of the graphical pointer within display device 14. For example, screen monitor module 114 causes a window to surface within a GUI in response to a user selection of a location within the window. In addition, according to present invention, screen monitor module 114 selectively controls the traversal rate of the graphical pointer when the graphical pointer is positioned within a widget displayed within display device 14. Finally, the graphical pointer signal is passed to display device driver 106, which routes the data within the graphical pointer signal and other display data to display adapter 70, which translates the display data into the R, G, and B signals utilized to drive display device 14. Thus, the movement of trackball 19 of mouse 18 results in a corresponding movement of the graphical pointer displayed within display device 14.

Figure 4:
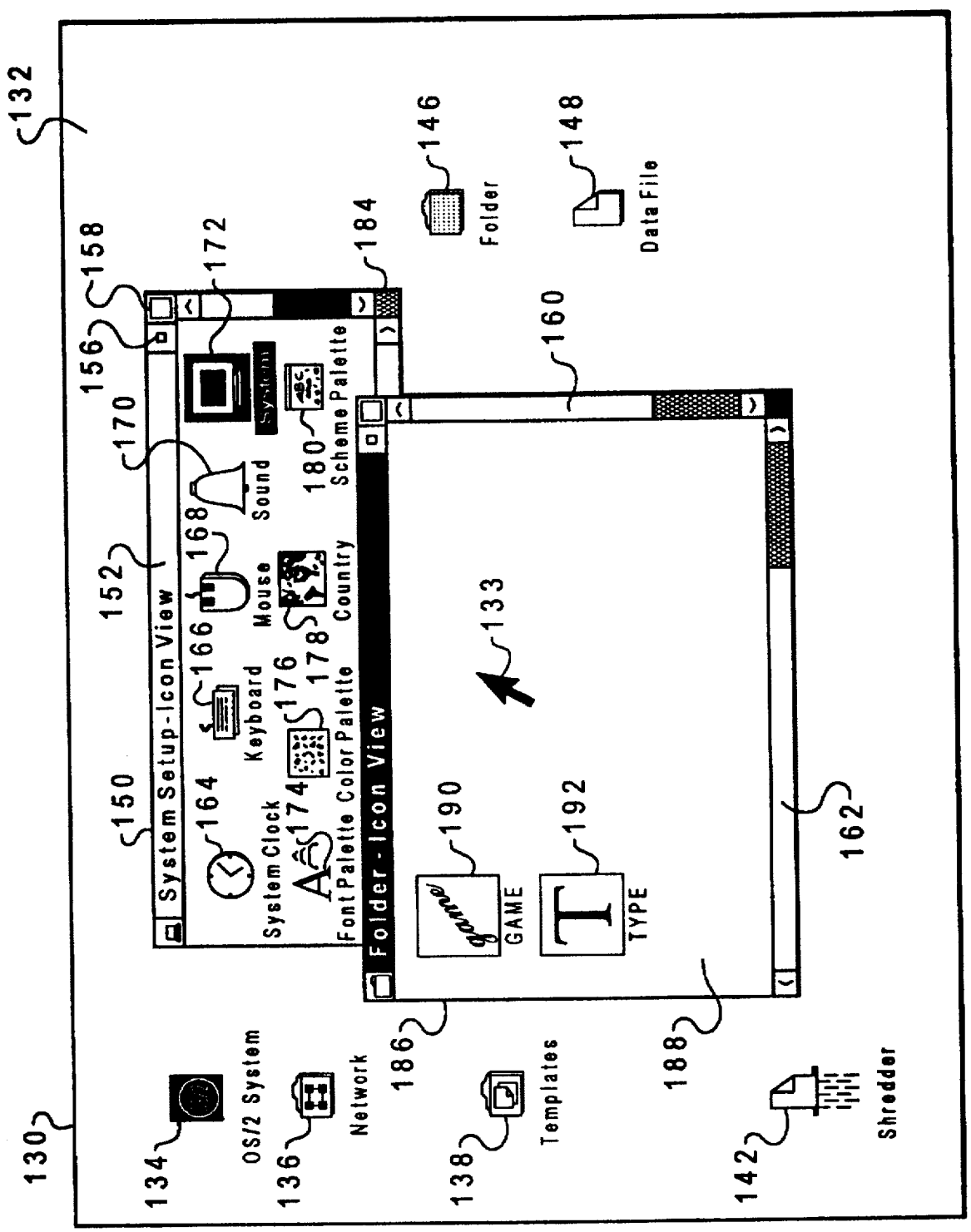
FIG. 4 depicts a pictorial representation of a desktop displayed within the display device of the data processing system illustrated in FIG. 1.

Referring now to FIG. 4, there is depicted a preferred embodiment of the graphical user interface (GUI) employed by OS 100. Screen 130 displayed to a user within display device 14 includes a background desktop 132 upon which a plurality of user-selectable icons 134–148 are displayed. Each icon 134–148 represents an program, function, or file storage area, which a user can conveniently select utilizing graphical pointer 133 by double-clicking the left button of mouse 18. When a user selects one of icons 134–148, the function corresponding to the selected icon is activated and the selected icon is highlighted. Many of icons 134–148 have an associated window or series of windows that are displayed when the icon is selected. For example, when OS/2 System icon 134 is selected, window 150 is displayed to the user to provide further possible selections (i.e., icons 164–180). In the depicted example, folder icon 146 has also been selected. Accordingly, folder window 186, which contains GAME icon 190 and TYPE icon 192, is also displayed to the user on desktop 132. Windows 150 and 186 include a title bar 152, which identifies the contents of each window, and shrink and grow buttons 142 and 144, which are utilized to minimize (close) or maximize (set to full screen size) each of windows 150 and 186. Each of windows 150 and 186 also provides vertical and horizontal scroll bars 160 and 162, respectively, to enable a user to scroll through the contents of the corresponding window and a display area 188, upon which a plurality of icons can be displayed. Finally, windows 150 and 186 include resizing box 184, which enables a user to resize the associated one of windows 150 or 186 utilizing the familiar drag-and-drop technique. According to the present invention, each of the hereinbefore described graphical features of the GUI depicted in FIG. 4, including desktop icons 134–148, windows 150 and 186, display areas 188, scroll bars 160 and 162, etc., can be defined as a widget, thereby enabling the traversal rate of graphical pointer 133 within each of these graphical features to be individually controlled.

With reference now to FIGS. 5A–5B, there are illustrated two windows utilized to control the traversal rate of graphical pointer 133 within the GUI display depicted in FIG. 4 according to a preferred embodiment of the present invention. To set the traversal rate of graphical pointer 133, the user selects mouse icon 168 depicted in FIG. 4. In response to user-selection of mouse icon 168, mouse control window 200 illustrated in FIG. 5A is displayed on desktop 132. Utilizing graphical pointer 133, the user can select between the mutually exclusive options within primary button control 204 and click speed control 202 to determine the rapidity of primary selection button of mouse 18 and the rapidity of button depressions required to make a selection, respectively. In addition, by manipulating slider bars 208 and 210, the user can set the vertical end horizontal sensitivity of graphical pointer 133 to movement of trackball 19 of mouse 18. As will be appreciated by those skilled in the art, desktop pointer speed control 206 enables a user to set a "global" traversal rate that is uniform throughout screen 130 of FIG. 4. Along the bottom edge of mouse control window 200 are displayed OK button 212, CANCEL button 214, and HELP button 216, which enable a user to confirm, cancel, or receive further information about selections within mouse control window 200. Furthermore, according to the present invention, mouse control window 200 includes widget features button 218, which is selected by a user to obtain further graphical pointer control options that enable control of graphical pointer 133 on a per widget basis.

Referring now to FIG. 5B, there is depicted a preferred embodiment of a window displayed to a user to provide customizable control of the graphical pointer traversal rate on a per widget basis. In response to user selection of widget features button 218 of mouse control window 200, widget features window 220 is displayed on desktop 132. To set a customized traversal rate for graphical pointer 133 within a particular widget, the user first selects a region of screen 130 from window list 222, which contains each open window displayed on desktop 132 in addition to desktop 132 itself. For example, in FIG. 5B, the user has selected folder window 186. Next, the user selects a feature within either window features list 224 or icon list 226. As illustrated, window features list 224 contains each feature of windows 150 and 186 while icon list 226 comprises a list of icons within the region selected within window list 224. In the depicted example, the user has selected the title bar within window features list 224 as the widget for which customized control of graphical pointer 133 is desired. Following the selection of one of the items within either window features list 224 or icon list 226, the user sets the traversal rate for the selected widget utilizing sliders 228 and 230 or buttons 234–238.

To set the traversal rate of graphical pointer 133 utilizing sliders 228 and 230, the user positions ganged switches 229 and 231 along sliders 228 and 230 to control the traversal rate of graphical pointer 133 within the perimeter and core, respectively, of the selected widget. If the user desires to independently set the perimeter traversal rate and the core traversal rate of graphical pointer 133, the user simply clicks on latch 232, thereby releasing switches 229 and 231 from latch 232 to slide independently. Various combinations of positions of switches 229 and 231 along sliders 228 and 230 give the selected widget different characteristics. For example, if switches 229 and 231 are positioned to give graphical pointer 133 a relatively slow traversal rate, the selected widget will be perceived by the user to be "sticky". Alternatively, the user may simply select sticky button 234, which sets the traversal rate of graphical pointer 133 within the selected widget to a default "sticky" setting. A "sticky" widget setting is advantageously applied to small widgets such as title bar 152 and shrink and grow buttons 156 and 158, which a user may have a difficult time selecting if the desktop pointer speed is set to a relatively fast traversal rate. In one embodiment of the present invention, the slowest setting of switches 229 and 231 causes graphical pointer 133 to have a zero traversal rate. In this preferred embodiment, once graphical pointer 133 is "parked" on a widget, graphical pointer 133 can be removed from the widget only by entering a secondary input, for example, a depression of the secondary mouse button, while manipulating mouse 18.

As a second option, switches 229 and 231 can both be positioned along sliders 228 and 230 to give graphical pointer 133 a relatively fast traversal rate. Alternatively, the user can simply select warp button 238, which sets the traversal rate of graphical pointer 133 to a system-determined fast traversal rate. It is useful to define widgets as "warp speed" widgets if the user has little reason to select either the widget itself of other widgets displayed within the widget. For example, referring to FIG. 4, the user can advantageously define display area 188 of folder window 186 as a "warp speed" widget because display area 188 is principally empty and gives a user little reason to select particular points within display area 188. As a third option, a user can define a particular widget as a "gravitational" widget utilizing either sliders 228 and 230 or gravitational button 236. A "gravitational" widget is one that has a slow core traversal rate and a fast perimeter traversal rate. Configuring a widget as a "gravitational" widget enables a user to quickly lock on to a feature within a GUI display, such as a window edge, which may otherwise be difficult to select, since graphical pointer 133 would tend to overtrack into the core of the widget once graphical pointer 133 was positioned within the widget's perimeter. The final widget option available within widget features window 220 is to set the traversal rate of graphical pointer 133 while within the widget to a default setting determined by the background of the widget. For example, if the selected widget is within folder window 186, selecting "set to default" button 240 would set the traversal rate of graphical pointer 133 to the traversal rate specified for folder window 186. Similarly, if the selected widget is one of icons 134–148 displayed on desktop 132, selecting "set to default" button 240 sets the traversal rate for that widget to the desktop pointer speed determined by the settings within desktop pointer speed control 206. As is typical of dialog boxes, widget features window 220 contains OK button 244 and CANCEL button 246, which enable the user to confirm or reject choices made within window features button 220. Those skilled in the art will recognize that the control features within dialog boxes 200 and 220 depicted in FIGS. 5A and 5B can be implemented in a variety of ways. However, in a preferred embodiment of the present invention, dialog boxes could be implemented as extensions to the Open Software Foundation (OSF) Motif™ programming language. Details of OSF Motif™ may be found in OSF/Motif™ Programmer's Reference, Release 1.2, available from Prentice-Hall.

Figure 6:
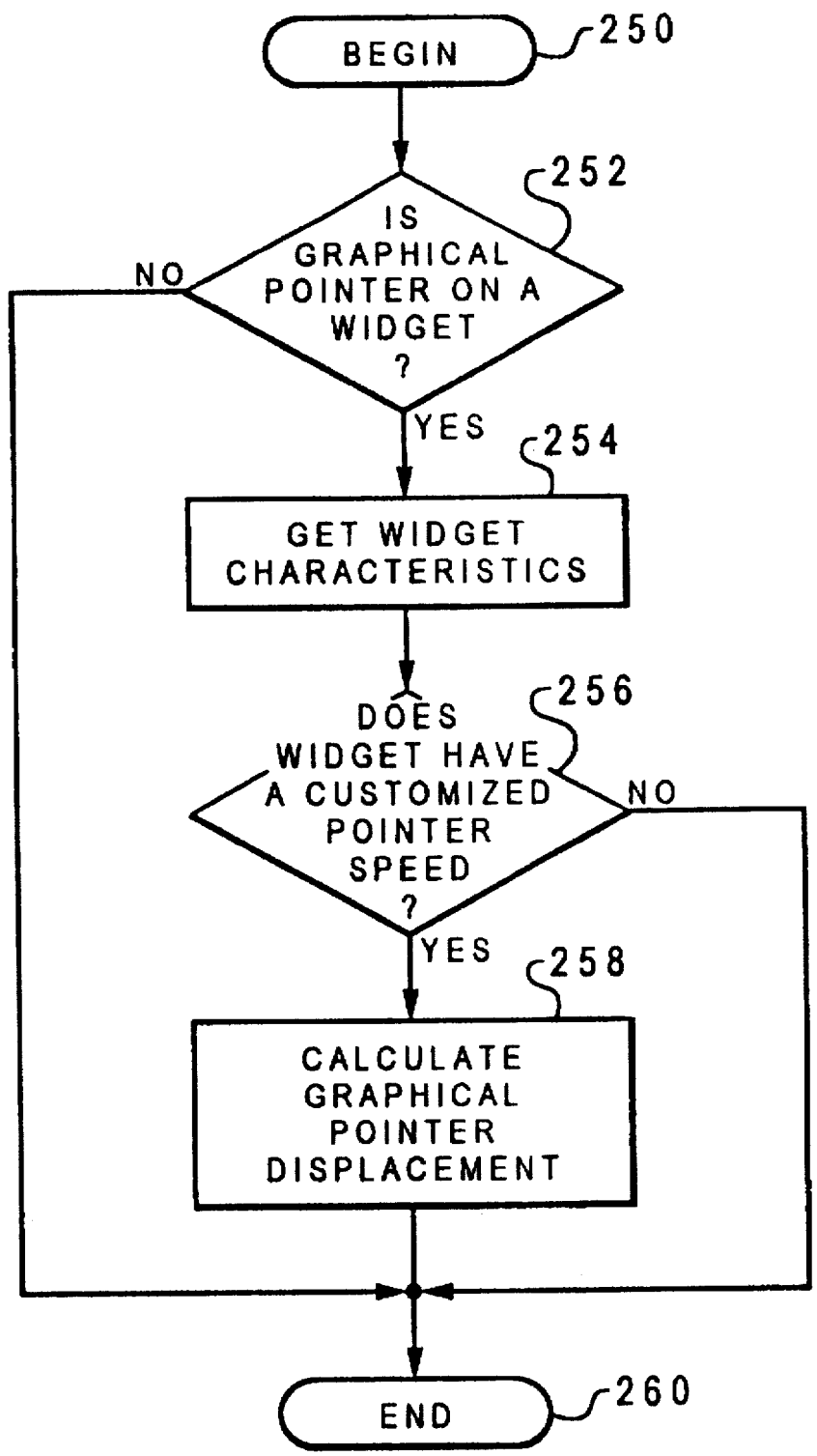
FIG. 6 is a flowchart depicting the method utilized by the present invention to control the tracking speed of a graphical pointer on a per widget basis.

Referring now to FIG. 6, there is depicted a high-level flowchart of a preferred embodiment of the method utilized by the present invention to determine the displacement of graphical pointer 133 in response to manipulation of mouse 18. The method illustrated within FIG. 6 is preferably implemented within screen monitor module 114 within kernel 102 of operating system 100; however, those skilled in the art will recognize that the method illustrated in FIG. 6 may alternatively be implemented within a stand-alone routine. As illustrated, the process begins at block 250 and thereafter proceeds to block 252, which illustrates screen monitor module 114 determining from the graphical pointer signal whether graphical pointer 133 is positioned on a widget. The logical determination depicted at block 252 utilizes the well-known method of comparing the X-Y coordinates of graphical pointer 133 with the boundaries of the defined widgets. If graphical pointer 133 is not positioned on a widget, the process proceeds to block 260, where normal computation of the position of graphical pointer 133 continues.

However, if graphical pointer 133 is positioned on a widget, the process proceeds from block 252 to block 254, which depicts screen monitor module 114 obtaining the characteristics of the widget on which graphical pointer 133 is positioned. The step illustrated at block 254 is preferably implemented utilizing the standard routine that screen monitor module 114 utilizes to determine what action should be performed when the user clicks on a widget. Next, the process passes to block 256, which depicts determining whether the traversal rate of graphical pointer 133 within the widget has been set to a customized setting. If not, the process proceeds to block 260, where normal processing continues. However, if the user has customized the traversal rate of graphical pointer 133 within the widget, the process passes to block 258, which depicts screen monitor module 114 determining an adjustment to the displacement of graphical pointer 133.

In a preferred embodiment of the present invention, the positions of switches 229 and 231 along the sliders 228 and 230 are translated into a binary multiplication or division factor. Thus, for example, if the widget is configured as a "warp speed" widget, the value which determines the displacement of graphical pointer 133 is shifted to the left an appropriate number of bits, thereby increasing the traversal rate of graphical pointer 133 by a power of two for each bit shifted. Conversely, if the widget is configured as a "sticky" widget, the traversal rate value for graphical pointer 133 is shifted to the right once for each power of two decrease in displacement. In an alternate embodiment of the present invention, an increase or decrease in the traversal rate of graphical pointer 133 can be controlled by adding or subtracting a value to the traversal rate controlled by desktop pointer speed control 206.

As has been described, the present invention provides an improved method and system for controlling a graphical pointer within a graphical user interface. In particular, the present invention enables a user to easily customize the traversal rate of a graphical pointer on a per widget basis, thereby further enhancing the appeal of a graphical user interface as an intuitive and user-friendly method of interacting with a data processing system.

As described above, aspects of the present invention pertain to specific "method steps" implementable on computer systems. In an alternate embodiment, the invention may be implemented as a computer program product for use with a computer system. Those skilled in the art should readily appreciate that programs defining the functions of the present invention can be delivered to a computer in many forms, which include, but are not limited to: (a) information permanently stored on non-writable storage media (e.g. read only memory devices within a computer such as ROM 86 or optical disks readable by CD-ROM drive 24); (b) information alterably stored on writable storage media (e.g., floppy disks within diskette drive 22 or hard disk drive 24); or (c) information conveyed to a computer through communication media, such as through a computer or telephone network. It should be understood, therefore, that such media, when carrying computer readable instructions that direct the method functions of the present invention, represent alternate embodiments of the present invention.

While the invention has been particularly shown and described with reference to a preferred embodiment, it will be understood by those skilled in the art that various changes in form and detail may be made therein without departing from the spirit and scope of the invention.

What is claimed is:

1. A method for controlling the movement of a graphical pointer displayed within a display device of a data processing system, said data processing system including a graphical pointing device having a selection means associated therewith, said method comprising:

displaying a predefined region within said display device, wherein said predefined region is a portion of an output display of said display device;

displaying a graphical pointer within said display device;

defining a first relationship that correlates manipulation of said graphical pointing device and movement of said graphical pointer when said graphical pointer is displayed within said predefined region, wherein said first relationship specifies that said displacement of said graphical pointer in response to manipulation of said graphical pointing device is zero unless said selection means is activated;

defining a second relationship which correlates manipulation of said graphical pointing device and movement of said graphical pointer when said graphical pointer is displayed outside said predefined region;

in response to a manipulation of said graphical pointing device, moving said graphical pointer in accordance with said first relationship when said graphical pointer is displayed at positions within said predefined region and in accordance with said second relationship when said graphical pointer is displayed at positions outside said predefined region.

2. The method for controlling the movement of a graphical pointer of claim 1, wherein said step of defining a first relationship comprises the step of defining a relationship in which said graphical pointer has a greater displacement in response to an incremental manipulation of said graphical pointing device than in said second relationship.

3. The method for controlling the movement of a graphical pointer of claim 2, wherein said step of defining said first relationship comprises the step of defining a relationship equal to said second relationship plus a positive constant.

4. The method for controlling the movement of a graphical pointer of claim 1, wherein said step of defining a first relationship comprises the step of defining a relationship in which said graphical pointer has a smaller displacement in response to an incremental manipulation of said graphical pointing device than said graphical pointer has in said second relationship when said selection device is activated.

5. The method for controlling the movement of a graphical pointer of claim 4, wherein said step of defining said first relationship comprises the step of defining a relationship equal to said second relationship minus a positive constant.

6. A system for controlling the movement of a graphical pointer within a data processing system, said data processing system including a graphical pointing device having a selection means associated therewith, said system comprising:

means for displaying a predefined region within said display device, wherein said predefined region is a portion of an output display of said display device;

means for displaying a graphical pointer within said display device;

means for defining a first relationship that correlates manipulation of said graphical pointing device and movement of said graphical pointer when said graphical pointer is displayed within said predefined region, wherein said first relationship specifies that said displacement of said graphical pointer in response to manipulation of said graphical pointing device is zero unless said selection means is activated.;

means for defining a second relationship which correlates manipulation of said graphical pointing device and movement of said graphical pointer when said graphical pointer is displayed outside said predefined region;

means, responsive to a manipulation of said graphical pointing device, for moving said graphical pointer in accordance with said first relationship when said graphical pointer is displayed at positions within said predefined region and in accordance with said second relationship when said graphical pointer is displayed at positions outside said predefined region.

7. The system for controlling the movement of a graphical pointer of claim 6, wherein said means for defining a first relationship comprises means for defining a relationship in which said graphical pointer has a greater displacement in response to an incremental manipulation of said graphical pointing device than in said second relationship.

8. The system for controlling the movement of a graphical pointer of claim 7, wherein said first relationship is equal to said second relationship plus a positive constant.

9. The system for controlling the movement of a graphical pointer of claim 6, wherein said means for defining a first relationship comprises means for defining a relationship in which said graphical pointer has a smaller displacement in response to an incremental manipulation of said graphical pointing device than said graphical pointer has in said second relationship when said selection means is activated.

10. The system for controlling the movement of a graphical pointer of claim 9, wherein said first relationship is equal to said second relationship minus a positive constant.

11. The system for controlling the movement of a graphical pointer of claim 6, wherein said predefined region comprises at least a portion of a window displayed within said display device.

12. The system for controlling the movement of a graphical pointer of claim 6, wherein said predefined region comprises a selectable icon.

13. A computer program product within a computer readable medium for causing a data processing system to control the movement of a graphical pointer displayed within a display device of said data processing system, said data processing system including a graphical pointing device having a selection means associated therewith, said computer program product comprising:

instruction means for causing said data processing system to display a predefined region within said display device, wherein said predefined region is a portion of an output display of said display device;

instruction means for causing said data processing system to display a graphical pointer within said display device;

instruction means for causing said data processing system to define a first relationship which correlates manipulation of said graphical pointing device and movement of said graphical pointer when said graphical pointer is displayed within said predefined region, wherein said first relationship specifies that said displacement of said graphical pointer in response to manipulation of said graphical pointing device is zero unless said selection means is activated;

instruction means for causing said data processing system to define a second relationship which correlates manipulation of said graphical pointing device and movement of said graphical pointer when said graphical pointer is displayed outside said predefined region;

instruction means, responsive to a manipulation of said graphical pointing device, for causing said data processing system to move said graphical pointer in accordance with said first relationship when said graphical pointer is displayed at positions within said predefined region and in accordance with said second relationship when said graphical pointer is displayed at positions outside.

14. The computer program product of claim 13, wherein said instruction means for causing said data processing system to define a first relationship comprises instruction means for causing said data processing system to define a relationship in which said graphical pointer has a greater displacement in response to an incremental manipulation of said graphical pointing device than in said second relationship.

15. The computer program product of claim 14, wherein said first relationship is equal to said second relationship plus a positive constant.

16. The computer program product of claim 13, wherein said instruction means for causing said data processing system to define a first relationship comprises instruction means for causing said data processing system to define a relationship in which said graphical pointer has a smaller displacement in response to an incremental manipulation of said graphical pointing device than said graphical pointer has in said second relationship when said selection means is activated.

17. The computer program product of claim 16, wherein said first relationship is equal to said second relationship minus a positive constant.

* * * * *